(12) United States Patent
Herbsommer et al.

(10) Patent No.: US 10,605,986 B2
(45) Date of Patent: *Mar. 31, 2020

(54) MATCHING IMPEDANCE OF A DIELECTRIC WAVEGUIDE TO A LAUNCHING MECHANISM

(71) Applicant: TEXAS INSTRUMENTS INCORPORATED, Dallas, TX (US)

(72) Inventors: Juan Alejandro Herbsommer, Allen, TX (US); Benjamin S. Cook, Dallas, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/387,843

(22) Filed: Apr. 18, 2019

(65) Prior Publication Data
US 2019/0243065 A1 Aug. 8, 2019

Related U.S. Application Data

(63) Continuation of application No. 15/608,323, filed on May 30, 2017, now Pat. No. 10,302,860, which is a (Continued)

(51) Int. Cl.
*G02B 6/122* (2006.01)
*H04B 10/25* (2013.01)
(Continued)

(52) U.S. Cl.
CPC ............ *G02B 6/1221* (2013.01); *B29C 33/38* (2013.01); *G02B 6/036* (2013.01); *G02B 6/13* (2013.01);
(Continued)

(58) Field of Classification Search
CPC ...... G02B 6/1221; G02B 6/42; G02B 6/4203; G02B 6/036; G02B 6/13; B33Y 10/00; B33Y 80/00; H04B 10/25; B29C 3/38
See application file for complete search history.

(56) References Cited

U.S. PATENT DOCUMENTS 4,825,221 A 4/1989 Suzuki
6,387,969 B1 5/2002 Yamamoto
(Continued)

OTHER PUBLICATIONS

"3D Printing", Wikipedia, pp. 1-35, available at http://en.wikipedia.org/w/index.php?title=3D_printing&oldid=624190184 on Sep. 4, 2014.
(Continued)

*Primary Examiner* — Ted M Wang
(74) *Attorney, Agent, or Firm* — Michelle F. Murray; Charles A. Brill; Frank D. Cimino

(57) ABSTRACT

A digital system has a dielectric core waveguide that has a longitudinal dielectric core member. The core member has a body portion and a transition region, with a cladding surrounding the dielectric core member. The body portion of the core member has a first dielectric constant. The transition region of the core member has a graduated dielectric constant value that gradually changes from the first dielectric constant value adjacent the body portion to a third dielectric constant.

20 Claims, 9 Drawing Sheets

Related U.S. Application Data continuation of application No. 14/506,639, filed on Oct. 4, 2014, now Pat. No. 9,696,490.

(60) Provisional application No. 61/977,396, filed on Apr. 9, 2014.

(51) Int. Cl.

| | | |
|---|---|---|
| *G02B 6/42* | (2006.01) | |
| *B29C 33/38* | (2006.01) | |
| *G02B 6/036* | (2006.01) | |
| *G02B 6/13* | (2006.01) | |
| *B33Y 10/00* | (2015.01) | |
| *B33Y 80/00* | (2015.01) | |

(52) U.S. Cl.
CPC ............... *G02B 6/42* (2013.01); *H04B 10/25* (2013.01); *B33Y 10/00* (2014.12); *B33Y 80/00* (2014.12); *G02B 6/4203* (2013.01)

(56) References Cited

U.S. PATENT DOCUMENTS

| | | |
|---|---|---|
| 9,484,614 B2 | 11/2016 | Herbsommer |
| 9,515,366 B2 | 12/2016 | Herbsommer |
| 9,696,490 B2 | 7/2017 | Herbsommer |
| 2002/0041734 A1 | 4/2002 | Worchesky |
| 2004/0114207 A1 | 6/2004 | Freund |
| 2004/0114868 A1 | 6/2004 | Roberson |
| 2008/0238796 A1* | 10/2008 | Rofougaran ........... H01Q 1/005 343/776 |
| 2008/0310808 A1 | 12/2008 | Fried |
| 2010/0255461 A1 | 10/2010 | Callenbach |
| 2015/0303653 A1* | 10/2015 | Tanaka ................ G02B 6/1228 398/200 |

OTHER PUBLICATIONS

C. Yeh and F.I. Shimabukuro, "The Essence of Dielectric Waveguides", Springer Science + Business Media, LLC, New York, New York, Jun. 2008, pp. 46-47.

Viginia Semiconductor, The General Properties of Si, Ge, SiGe, Si02 and Si3N4, dated Jun. 2002.

* cited by examiner

MATCHING IMPEDANCE OF A DIELECTRIC WAVEGUIDE TO A LAUNCHING MECHANISM

CROSS-REFERENCE TO RELATED APPLICATIONS

This application is a continuation of U.S. patent application Ser. No. 15/608,323, filed May 30, 2017, which was a continuation of U.S. patent application Ser. No. 14/506,639, filed Oct. 4, 2014, which claims priority to U.S. Provisional Patent Application No. 61/977,396 filed Apr. 9, 2014, all of which are hereby incorporated herein by reference herein in their entireties.

FIELD OF THE INVENTION

This invention generally relates to wave guides for high frequency signals, and in particular to waveguides with dielectric cores.

BACKGROUND OF THE INVENTION

In electromagnetic and communications engineering, the term waveguide may refer to any linear structure that conveys electromagnetic waves between its endpoints. The original and most common meaning is a hollow metal pipe used to carry radio waves. This type of waveguide is used as a transmission line for such purposes as connecting microwave transmitters and receivers to their antennas, in equipment such as microwave ovens, radar sets, satellite communications, and microwave radio links.

A dielectric waveguide employs a solid dielectric core rather than a hollow pipe. A dielectric is an electrical insulator that can be polarized by an applied electric field. When a dielectric is placed in an electric field, electric charges do not flow through the material as they do in a conductor, but only slightly shift from their average equilibrium positions causing dielectric polarization. Because of dielectric polarization, positive charges are displaced toward the field and negative charges shift in the opposite direction. This creates an internal electric field which reduces the overall field within the dielectric itself. If a dielectric is composed of weakly bonded molecules, those molecules not only become polarized, but also reorient so that their symmetry axis aligns to the field. While the term "insulator" implies low electrical conduction, "dielectric" is typically used to describe materials with a high polarizability; which is expressed by a number called the relative permittivity ($\varepsilon k$). The term insulator is generally used to indicate electrical obstruction while the term dielectric is used to indicate the energy storing capacity of the material by means of polarization.

Permittivity is a material property that expresses a measure of the energy storage per unit meter of a material due to electric polarization $(J/V^2)/(m)$. Relative permittivity is the factor by which the electric field between the charges is decreased or increased relative to vacuum. Permittivity is typically represented by the Greek letter $\varepsilon$. Relative permittivity is also commonly known as dielectric constant.

Permeability is the measure of the ability of a material to support the formation of a magnetic field within itself in response to an applied magnetic field. Magnetic permeability is typically represented by the Greek letter $\mu$.

The electromagnetic waves in a metal-pipe waveguide may be imagined as travelling down the guide in a zig-zag path, being repeatedly reflected between opposite walls of the guide. For the particular case of a rectangular waveguide, it is possible to base an exact analysis on this view. Propagation in a dielectric waveguide may be viewed in the same way, with the waves confined to the dielectric by total internal reflection at its surface.

BRIEF DESCRIPTION OF THE DRAWINGS

Particular embodiments in accordance with the invention will now be described, by way of example only, and with reference to the accompanying drawings.

Figure 1:
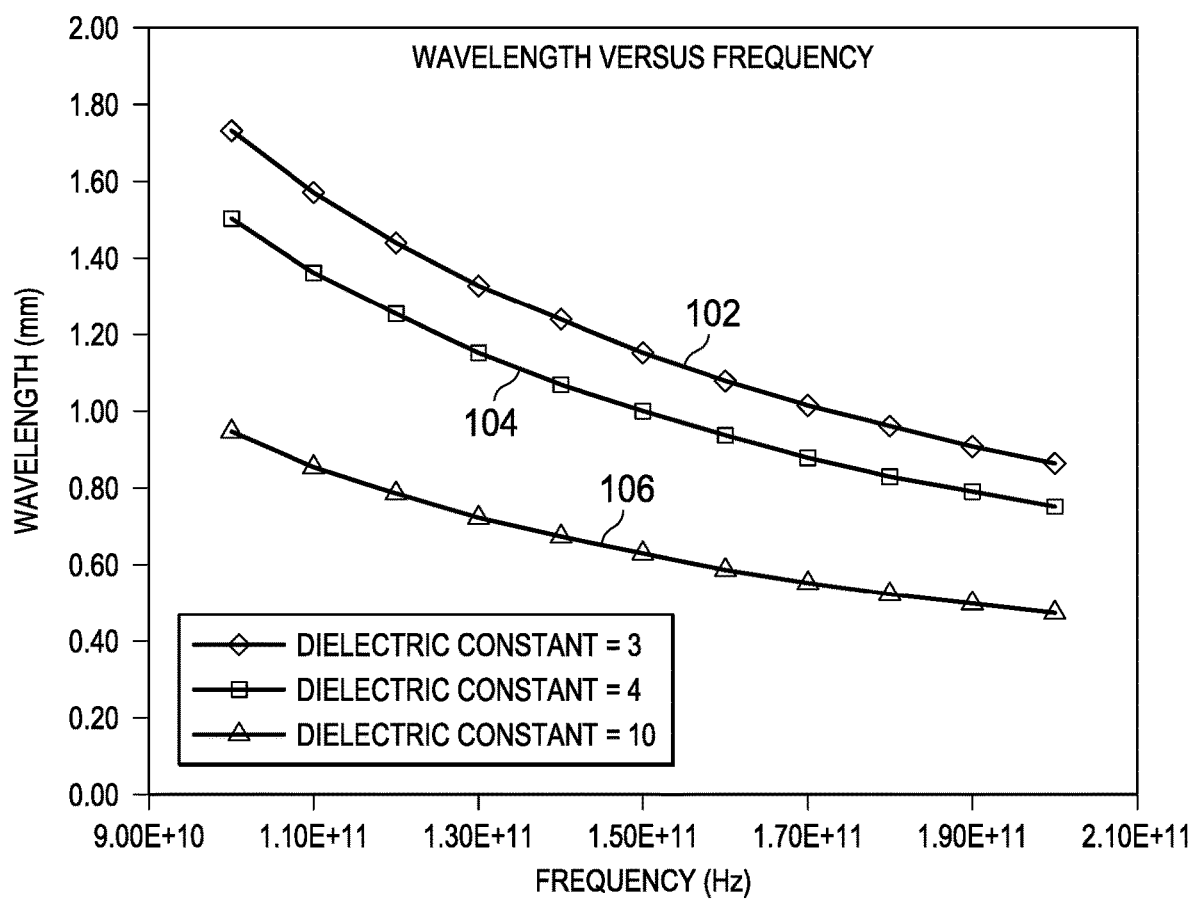
FIG. 1 is a plot of wavelength versus frequency through materials of various dielectric constants.

Other features of the present embodiments will be apparent from the accompanying drawings and from the detailed description that follows.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

As frequencies in electronic components and systems increase, the wavelength decreases in a corresponding manner. For example, many computer processors now operate in the gigahertz realm. As operating frequencies increase sub-terahertz, the wavelengths become short enough that signal lines that exceed a short distance may act as an antenna and signal radiation may occur. FIG. 1 is a plot of wavelength versus frequency through materials of various dielectric constants. As illustrated by plot 102 which represents a material with a low dielectric constant of 3, such as a printed circuit board, a 100 GHz signal will have a wavelength of approximately 1.7 mm. Thus, a signal line that is only 1.7 mm in length may act as a full wave antenna and radiate a significant percentage of the signal energy. In fact, even lines of λ/10 are good radiators, therefore a line as short as 170 um may act as a good antenna at this frequency.

Waves in open space propagate in all directions, as spherical waves. In this way they lose their power proportionally to the square of the distance; that is, at a distance R from the source, the power is the source power divided by R2. A wave guide may be used to transport high frequency signals over relatively long distances. The waveguide confines the wave to propagation in one dimension, so that under ideal conditions the wave loses no power while propagating. Electromagnetic wave propagation along the axis of the waveguide is described by the wave equation, which is derived from Maxwell's equations, and where the wavelength depends upon the structure of the waveguide, and the material within it (air, plastic, vacuum, etc.), as well as on the frequency of the wave. Commonly-used waveguides are only of a few categories. The most common kind of waveguide is one that has a rectangular cross-section, one that is usually not square. It is common for the long side of this cross-section to be twice as long as its short side. These are useful for carrying electromagnetic waves that are horizontally or vertically polarized.

For the exceedingly small wavelengths encountered for sub-THz radio frequency (RF) signals, dielectric waveguides perform well and are much less expensive to fabricate than hollow metal waveguides. Furthermore, a metallic waveguide has a frequency cutoff determined by the size of the waveguide. Below the cutoff frequency there is no propagation of the electromagnetic field. Dielectric waveguides may have a wider range of operation without a fixed cutoff point. However, a purely dielectric waveguide may be subject to interference caused by touching by fingers or hands, or by other conductive objects. Metallic waveguides confine all fields and therefore do not suffer from EMI (electromagnetic interference) and cross-talk issues; therefore, a dielectric waveguide with a metallic cladding may provide significant isolation from external sources of interference. Various types of dielectric core waveguides will be described in more detail below.

Various configurations of dielectric waveguides (DWG) and interconnect schemes are described in U.S. patent application Ser. No. 13/854,935 filed Apr. 1, 2013, entitled "Dielectric Waveguide Manufactured Using Printed Circuit Board Technology" and are incorporated by reference herein. Various antenna configurations for launching and receiving radio frequency signals to/from a DWG are also described therein and are incorporated by reference herein.

Figure 2:
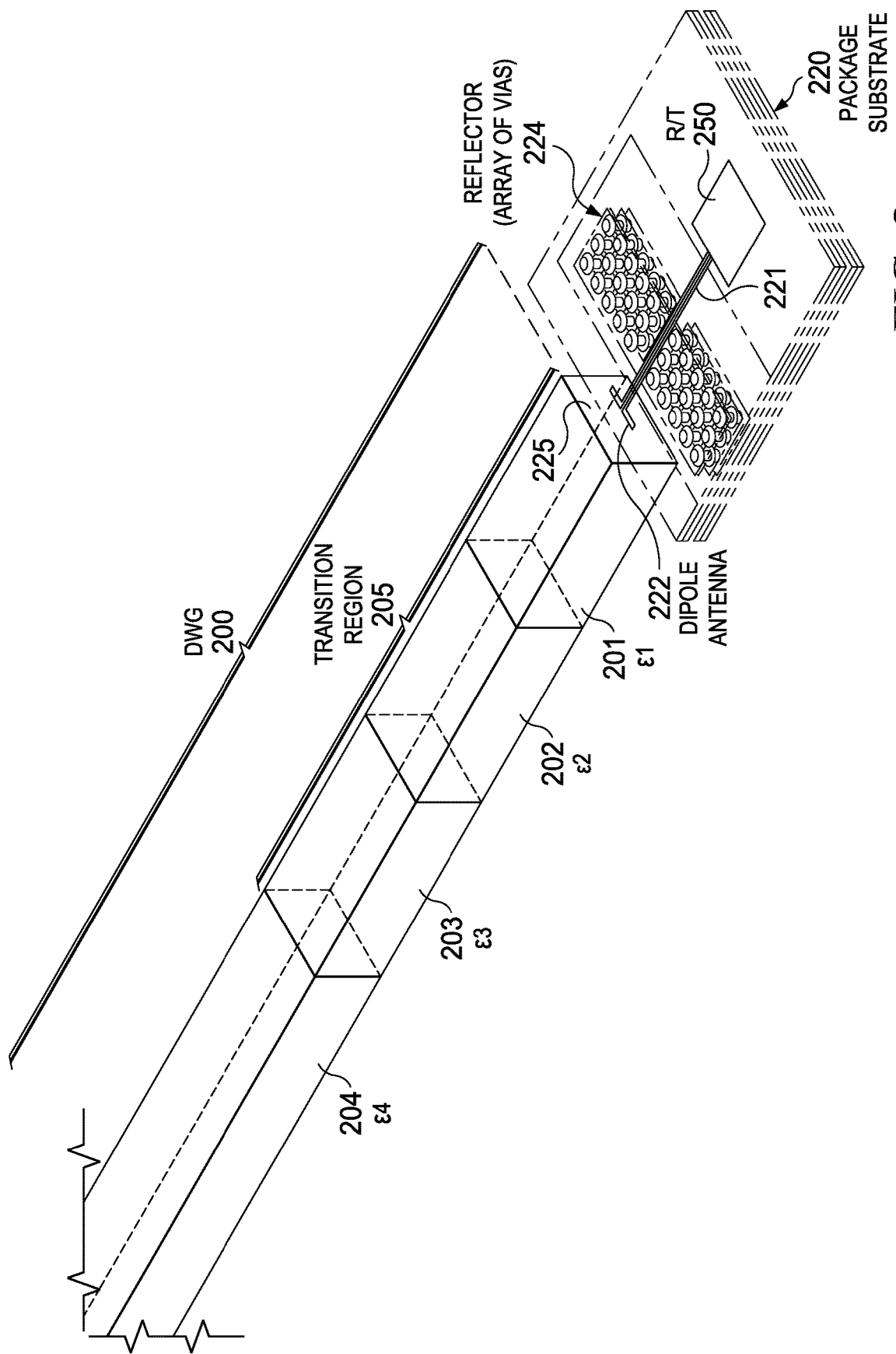
FIG. 2 is an illustration of a dielectric waveguide with varying dielectric constant values along the direction of propagation.

FIG. 2 is an illustration of a system that includes a dielectric waveguide with varying dielectric constant values along the direction of propagation. In this example system, an integrated circuit (IC) includes high frequency circuitry 250 that produces a signal that is connected to a dipole antenna 222 that is configured to launch an electromagnetic signal into an adjacent DWG 200. In this example, high frequency circuitry 250 is a transceiver that includes both a transmitter and receiver coupled to the same dipole antenna; however, in another embodiment high frequency circuitry 250 may only include a transmitter or only a receiver. In this example, substrate 220 may be part of the IC, or the IC may be mounted on substrate 220. An edge of substrate 220 forms an interface area 225 where the dipole antenna is positioned. A microstrip line 221 couples the dipole antenna to high frequency circuitry 250. A reflector 224 is provided to cause electromagnetic energy that radiates from the back side of dipole antenna 222 to be reflected back towards DWG 200 in order to improve signal coupling into DWG 200. DWG 200 will typically have an outer layer, but for simplicity the outer layer is not shown in this illustration. The outer layer may be another dielectric material that has a lower dielectric constant value than the core, or the outer layer may be a metallic or otherwise conductive layer, for example.

A flexible waveguide configuration may have a core member made from flexible dielectric material with a high dielectric constant and be surrounded with a cladding made from flexible dielectric material with a low dielectric constant. While theoretically, air could be used in place of the cladding, since air has a dielectric constant of approximately 1.0, any contact by humans, or other objects may introduce serious impedance mismatch effects that may result in signal loss or corruption. Therefore, typically free air does not provide a suitable cladding.

It is beneficial to match the impedance of a dielectric waveguide with its launching mechanism, such as dipole antenna 222 in this example. This is necessary in order to allow an optimum power transfer of the signal between the antenna and the dielectric waveguide.

In terms of the parameters of an electromagnetic wave and the medium it travels through, the wave impedance is given by equation (1).

$$Z = \sqrt{\frac{j\omega\mu}{\sigma + j\omega\varepsilon}} \quad (1)$$

where μ is the magnetic permeability, ε is the electric permittivity and σ is the electrical conductivity of the material the wave is travelling through. In the equation, j is the imaginary unit, and ω is the angular frequency of the wave. In the case of a dielectric, where the conductivity is zero, equation (1) reduces to equation (2).

$$Z = \sqrt{\frac{\mu}{\varepsilon}} \quad (2)$$

For a hollow metallic waveguide, the ratio of the transverse electric field to the transverse magnetic field for a propagating mode at a particular frequency is the waveguide impedance. For any waveguide in the form of a hollow metal tube, (such as rectangular guide, circular guide, or double-ridge guide), the wave impedance of a travelling wave is dependent on the frequency, but is typically the same throughout the guide. For transverse electric (TE) modes of propagation the wave impedance may be defined by equation (3).

$$Z = \frac{z_0}{\sqrt{1 - \left(\frac{fc}{f}\right)^2}} \quad (3)$$

where $Z_0$ is the wave impedance of plane waves in free space and fc is the cut-off frequency of the propagation mode. For transverse magnetic (TM) modes of propagation the wave impedance may be given by equation (4).

$$Z = Z_0\sqrt{1 - \left(\frac{fc}{f}\right)^2} \quad (4)$$

For a dielectric filled metallic waveguide, the analysis is similar, except the characteristic wave impedance through the dielectric is used rather than that of free space. However, in a pure dielectric waveguide, the situation is more complicated and becomes a function of the transverse spatial coordinates. See, for example, C. Yeh, "The Essence of Dielectric Waveguides," 2008, pages 46-47.

Polymer material commonly used to fabricate the dielectric core of a waveguide has a dielectric constant value that is typically in the range of 2.4-12, with lower values being more common and therefore less expensive. The impedance of a DWG using a commonly available polymer material having a dielectric constant of approximately 3.0 for signals in the range of 100 GHz is approximately 200-500 ohms. A dipole antenna such as antenna 222 may have a characteristic impedance of approximately 73 ohms, for example. Such a mismatch in impedance may reduce the coupling efficiency between antenna 222 and a typical DWG.

As can be seen from equation (2), the impedance of a DWG may be changed by varying the permittivity and/or the permeability of the dielectric material. Embodiments of the invention include a dielectric waveguide in which the dielectric constant and/or the permeability of the DWG is changed along the direction of propagation, as illustrated at 201-204. In order to have a maximum power transfer between the antenna and the DWG, the impedance of the DWG is gradually changed from the intrinsic impedance value produced by common polymer material to a value that better matches the antenna or other launching mechanism. In this manner, the return loss of the interface between the package and the DWG may be minimized.

As indicated in equation (2), the impedance of a dielectric core waveguide is a function of electric permittivity ($\varepsilon$); therefore, the impedance of the dielectric waveguide may be modified by changing the dielectric constant of the DWG within a transition region 205. This may be achieved in a number of ways, such as using different dielectric materials having different permittivities, or by doping one type of polymer with micro or nano-particles of materials of higher dielectric constant, such as: $BaTiO_3$ (barium titanate) or ZnO (zinc oxide), for example. Permittivity may be changed by anisotropic cross-linking of the same polymer such that cross-link density is changed with distance. Permeability may also be changed by doping or applying anisotropic magnetic fields to permeable materials.

Similarly, the impedance may be modified by changing the permeability of the DWG within the transition region 205.

In this example, transition region 205 includes three discrete sectors 201, 201, 203 with different dielectric constants $\varepsilon1$, $\varepsilon2$, $\varepsilon3$ that are selected to gradually adjust the impedance of each sector. The remainder of DWG 200 has a dielectric constant $\varepsilon4$ that is the intrinsic value provided by the polymer used to form the dielectric core.

Other embodiments may use more or fewer sectors to gradually adjust the impedance. In some embodiments, the transition region may have a gradual and continuous change in the dielectric constant to produce a smooth transition from a first impedance level at one end of the transition region to a second impedance level at an opposite end of the transition region. This may be implemented by gradually changing the concentration of dopants or microfillers along the length of the transition region.

A layer-by-layer additive fabrication technique such as inkjet-printing may be used to manufacture these steps of different dielectric constant polymers by printing the DWG directly onto a substrate, as will be explained in more detail below. An initial sector 201 may be printed with a polymer solution where the concentration of high dielectric constant particles produces a dielectric constant of $\varepsilon1$ for this sector which results in an impedance of Z1. A second sector 202 may be printed with the same polymer solution but with a different concentration of doping material such that the dielectric constant is $\varepsilon2$ and the impedance Z2.

It can be demonstrated that the power transfer will be maximum when the condition of equation (5) is met.

$$Z1 = \sqrt{Z_{antenna} \times Z2} \tag{5}$$

The number of steps may be increased following the same rule, as illustrated in equation (6), until an optimum dielectric constant (and loss factor) is reached that may then be used to build the rest of the length of the DWG.

$$Z_{n+1} = \sqrt{Z_n \times Z_{n+2}} \tag{6}$$

This solution allows the geometry of the antenna to be maintained while varying the properties of the dielectric material to achieve the impedance matching. Other solutions to the problem of matching impedance are focused in changing the geometry of the design (traces, antennas etc.) or working with materials with fixed dielectric properties such as package substrates or PCBs (printed circuit boards). A problem with changing the geometry of the antenna is that in many cases, in order to match the DWG with the antenna design requires increasing or decreasing the size of the antenna to dimensions beyond the manufacturing capability or the standard dimensions for substrates and PCBs, for example.

Figure 3:
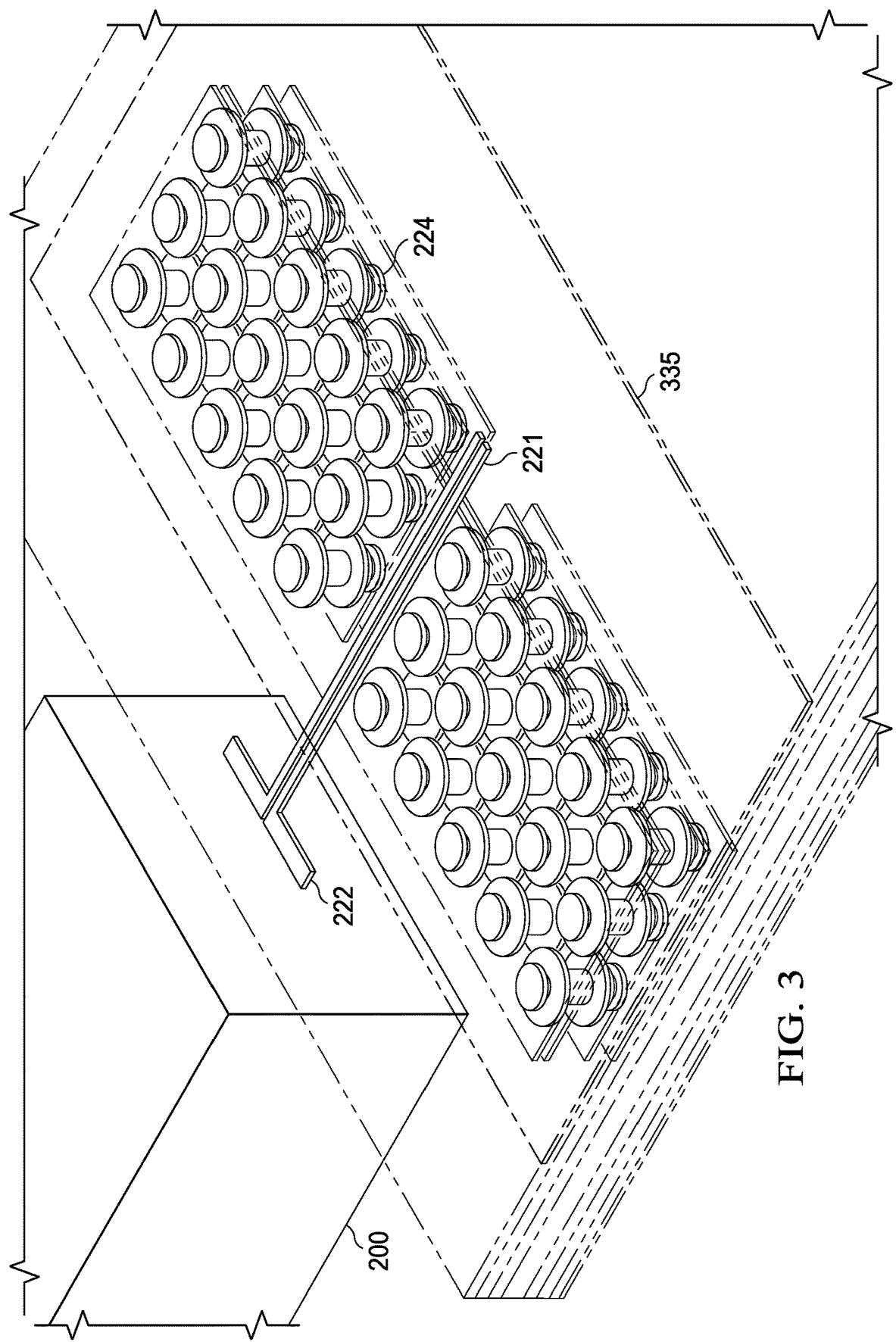
FIG. 3 is an isometric view of a reflector for use with a dipole antenna.
Figure 4:
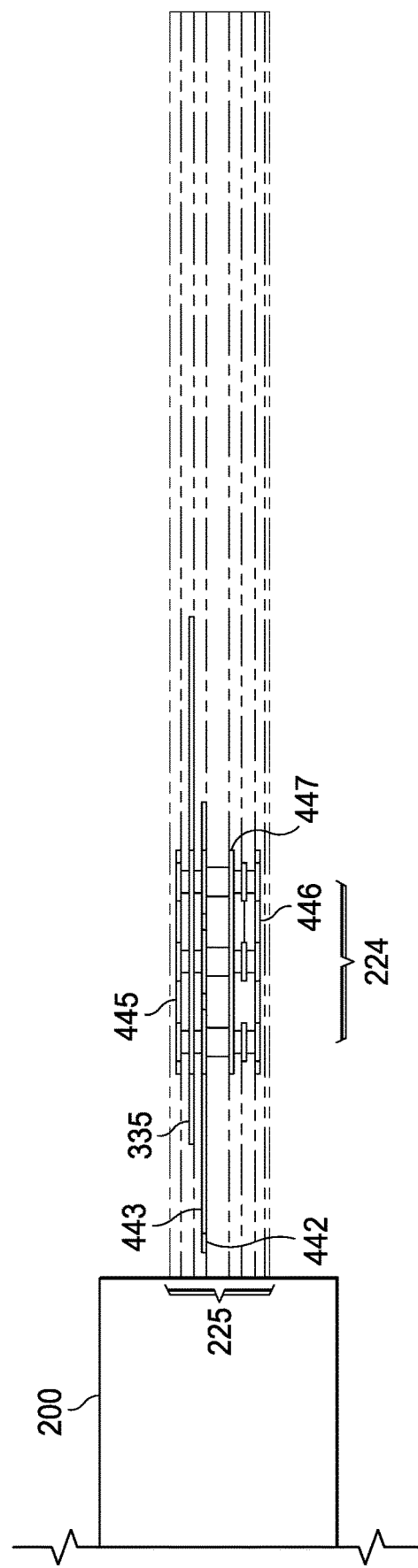
FIG. 4 is a sectional view of the reflector of FIG. 3

FIG. 3 is an isometric view and FIG. 4 is a sectional view of an example reflector array that may be used with a dipole antenna, which is an expanded view of the dipole antenna 222 and reflector 224 illustrated in FIG. 2. An outside edge of carrier 220 forms an interface surface 225 that is configured for interfacing to DWG 200. Reflector structure 224 is formed in the carrier substrate adjacent to dipole antenna 222 and opposite from the interface surface 225.

Differential signal lines 221 connect the dipole antenna 222 to transceiver 250 that is generating or receiving a sub-terahertz high frequency signal.

Ground plane 335 orients a signal launched from dipole antenna 222 in a direction towards DWG 200, but also in a direction away from DWG 200. Reflector 224 is an array of metalized vias between two coplanar plates 445, 446 that are above and below the plane that holds the dipole antenna 442. In some embodiments, there may be an additional reflector strap 447 coupled to the array of vias and running essentially parallel to the dipole antenna in the same plane as the dipole antenna. Additional parallel reflector straps may be added on other layers, if present. The goal is to erect an essentially vertical metallic "wall" that reflects radiated energy from dipole antenna 442 back towards DWG 200. The vias may be connected to ground, or may be left floating. The metal structure acts a "short" to the radiated field from the dipole antenna. Spacing the metal reflector structure approximately one half of a wavelength from the dipole antenna provides an optimum amount of reflection. Alternatively, the reflector structure may be placed a distance of 1.5, 2.5, etc. wavelengths from the dipole antenna. While a distance of one half wavelength is optimum, a distance in the range of 0.3-0.7 or multiples thereof provides a useful amount of reflection.

Several configurations of dielectric waveguides and methods for making them will now be described in more detail. In each example, a transition region such as transition region 205 may be formed on the end of the waveguide as described above.

Figure 5:
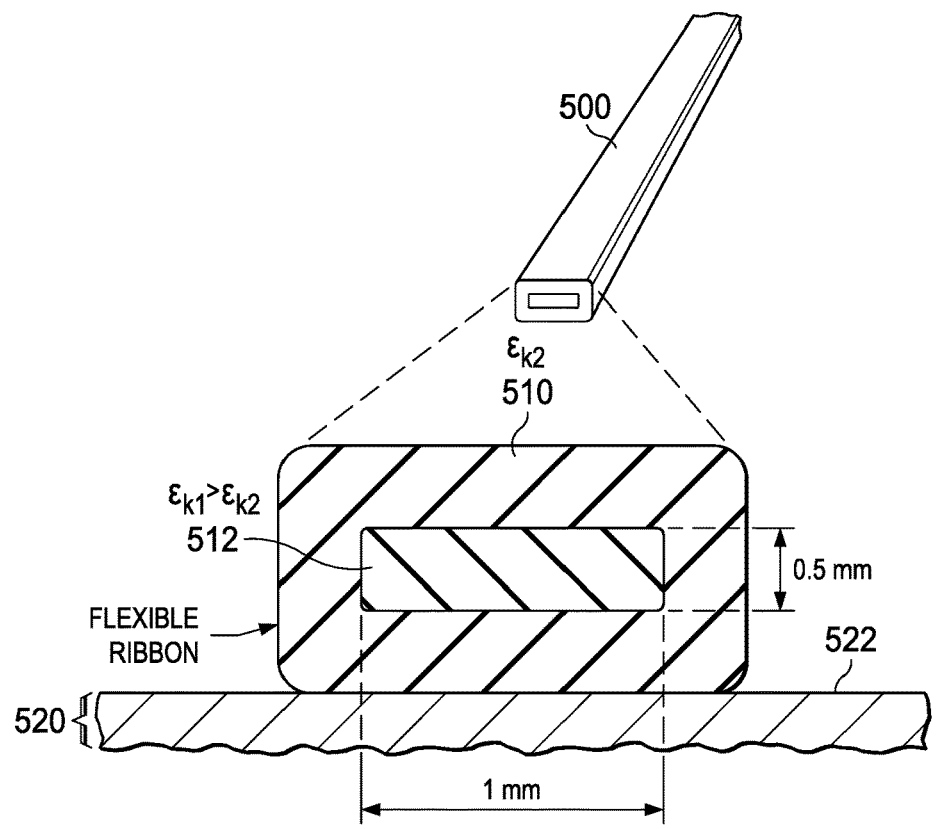
FIGS. 5-7 are illustrations of example waveguides.

FIG. 5 illustrates a DWG 500 that is configured as a thin ribbon of a core dielectric material surrounded by a dielectric cladding material. The core dielectric material has a dielectric constant value ε1, while the cladding has a dielectric constant value of ε2, where ε1 is greater than ε2. In this example, a thin rectangular ribbon of the core material 512 is surrounded by the cladding material 510. For sub-terahertz signals, such as in the range of 130-150 gigahertz, a core dimension of approximately 0.5 mm×1.0 mm works well. DWG 500 may be fabricated conformably onto surface 522 of substrate 520 using the inkjet printing process or other 3D printing process described in more detail below.

In this example, dielectric clad DWG 500 is fabricated on a surface 522 of a substrate 520, as will be explained in more detail below. This substrate may range from an integrated circuit (IC) die, a substrate in a multi-chip package, a printed circuit board (PCB) on which several ICs are mounted, etc., for example. The substrate may be any commonly used or later developed material used for electronic systems and packages, such as: silicon, ceramic, Plexiglas, fiberglass, plastic, metal, etc., for example. The substrate may be as simple as paper, for example.

Figure 6:
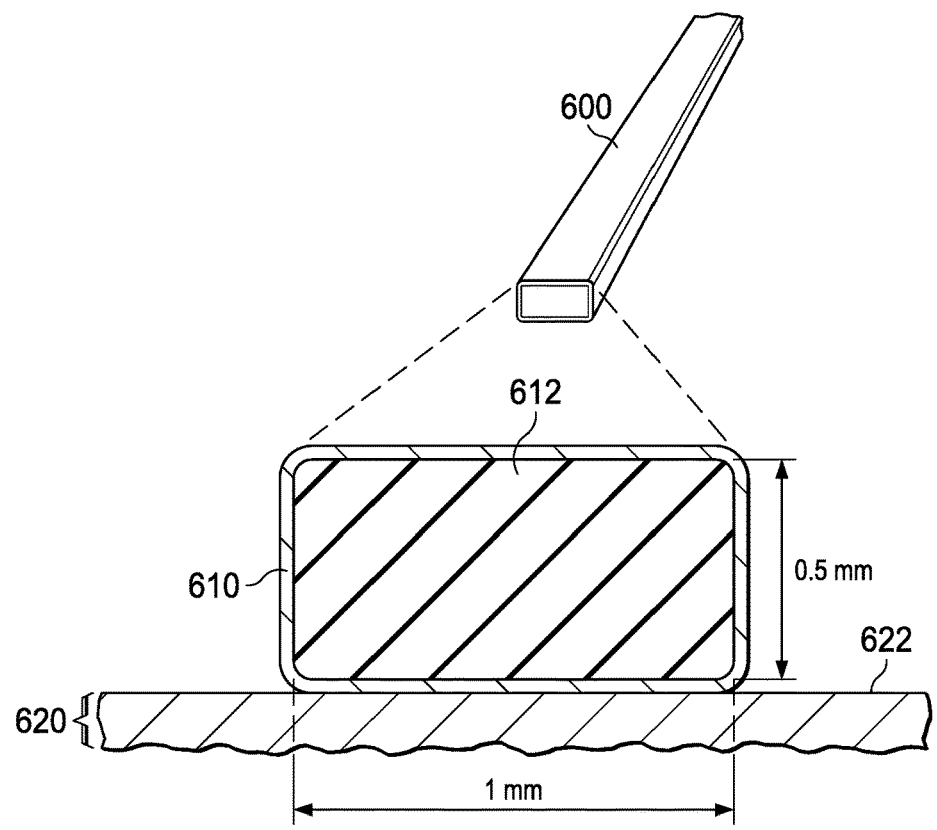

FIG. 6 illustrates a metallic, or other conductive material, clad DWG 600 that is configured as a thin ribbon of the core material 612 surrounded by the metallic cladding material 610. For sub-terahertz signals, such as in the range of 130-150 gigahertz, a core dimension of approximately 0.5 mm×1.0 mm works well.

In this example, metallic clad DWG 600 is fabricated on a surface 622 of a substrate 620. This substrate may range from an integrated circuit (IC) die, a substrate in a multi-chip package, a printed circuit board (PCB) on which several ICs are mounted, etc., for example. The substrate may be any commonly used or later developed material used for electronic systems and packages, such as: silicon, ceramic, Plexiglas, fiberglass, plastic, metal, etc., for example. The substrate may be as simple as paper, for example.

Figure 7:
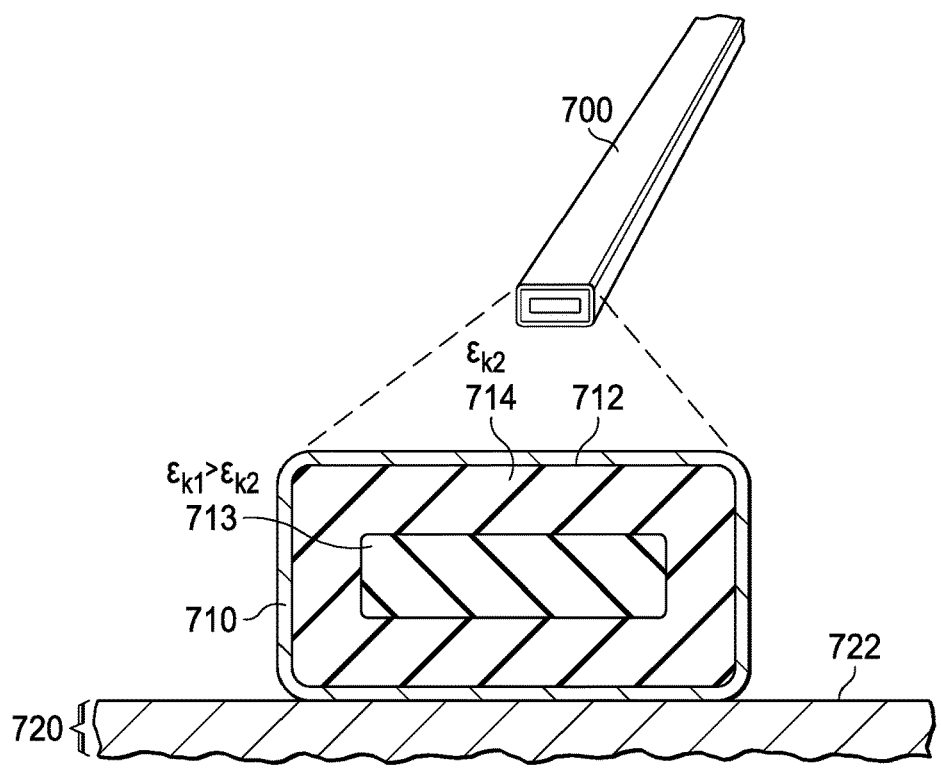

FIG. 7 illustrates a metallic, or other conductive material, clad DWG 700 that is configured as a thin ribbon of the core 712 surrounded by the metallic cladding material 710. In this example, core 712 comprises a thin rectangular ribbon of the core material 713 that is surrounded by a second layer of core material 714 to form a graded core 712. Core region 713 has a dielectric constant value of εk1, while core region 714 has a dielectric constant value of εk2, where εk1>εk2. In another embodiment, graded core 712 may comprise more than two layers of core material, with each layer having a different relative dielectric constant value ranging from relative permittivity of εr1-εrn, for example. In another example, the graded core may be implemented in such a manner that the dielectric constant value gradually varies from a higher value in the center to a lower value at the outside edge. In this manner, a graded core may be provided that tends to confine the sub-THz frequency signal to the core material and thereby reduce cutoff effects that may be produced by the metallic cladding, for example.

In this example, metallic clad DWG 700 is fabricated on a surface 722 of a substrate 720. This substrate may range from an integrated circuit (IC) die, a substrate in a multi-chip package, a printed circuit board (PCB) on which several ICs are mounted, etc., for example. The substrate may be any commonly used or later developed material used for electronic systems and packages, such as: silicon, ceramic, Plexiglas, fiberglass, plastic, metal, etc., for example. The substrate may be as simple as paper, for example.

Figure 8:
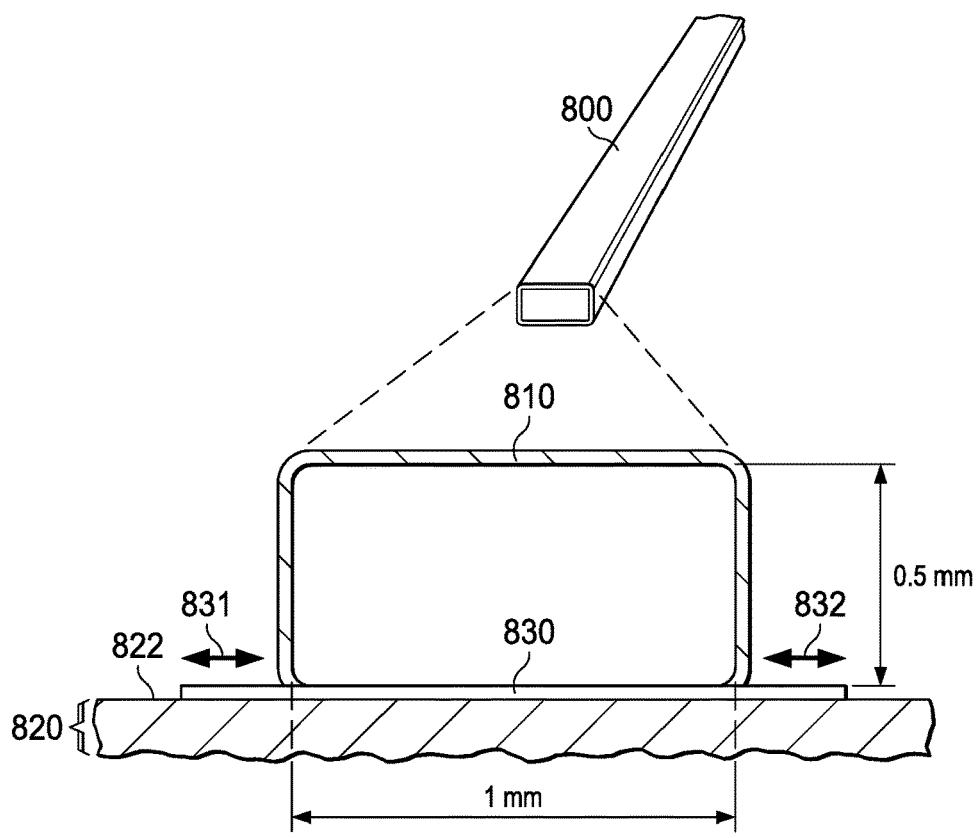
FIG. 8 illustrates another embodiment of any of the waveguides of FIGS. 5-7.

FIG. 8 illustrates another embodiment 800 of any of the waveguides of FIGS. 5-7. In this example, waveguide 800 is fabricated on a surface 822 of a substrate 820. This substrate may range from an integrated circuit (IC) die, a substrate in a multi-chip package, a printed circuit board (PCB) on which several ICs are mounted, etc., for example. The substrate may be any commonly used or later developed material used for electronic systems and packages, such as: silicon, ceramic, Plexiglas, fiberglass, plastic, metal, etc., for example. The substrate may be as simple as paper, for example.

For a metallic clad waveguide, such as those illustrated in FIGS. 6-7, a bottom portion of waveguide 800 may be formed by a conductive layer 830 that may extend along surface 822 beyond a footprint of waveguide 800, as indicated at 831, 832, for example. For a non-metallic DWG such as illustrated in FIG. 5, a bottom portion of waveguide 800 may be formed by a dielectric layer 830 that may extend along surface 822 beyond a footprint of waveguide 800, as indicated at 831, 832, for example. In either case, the extent of regions 831, 832 may be minimal, or they may cover an extended portion of surface 822, or even the entire surface 822, for example. Conductive layer 830 may be metallic or may be a conductive non-metallic material, for example.

Embodiments of the invention may be implemented using any of the dielectric core waveguides described above, for example. In each embodiment, a transition region will be formed at the end of the waveguide, as described above in more detail, in order to improve signal coupling efficiency with a signal launching mechanism.

The various dielectric core waveguide configurations described above may be fabricated using a printing process, such as an inkjet printer or other three dimensional printing mechanism. Fabrication of three dimensional structures using ink jet printers or similar printers that can "print" various polymer materials is well known and need not be described in further detail herein. For example, see "3D printing," Wikipedia, Sep. 4, 2014. Printing allows for the rapid and low-cost deposition of thick dielectric and metallic layers, such as 0.1 um-1000 um thick, for example, while also allowing for fine feature sizes, such as 20 um feature sizes, for example. Standard integrated circuit (IC) fabrication processes are not able to process layers this thick. Standard macroscopic techniques, such as machining and etching, typically used to manufacture dielectric waveguides and metallic structures may only allow feature sizes down to 1 mm, for example. These thicker printed dielectric and metallic layers on the order of 100 nm-1 mm which are made possible by inkjet printing enable waveguide operation at Sub-THz and THz frequencies. Previously optical frequencies could be handled using standard semiconductor fabrication methods while lower frequencies may be handled using large metallic waveguides; however, there was a gap in technology for fabricating waveguides for THz signals. Printing the waveguides directly onto the chip/package/board mitigates alignment errors of standard waveguide assemblies and simplifies the packaging process.

Figure 9:
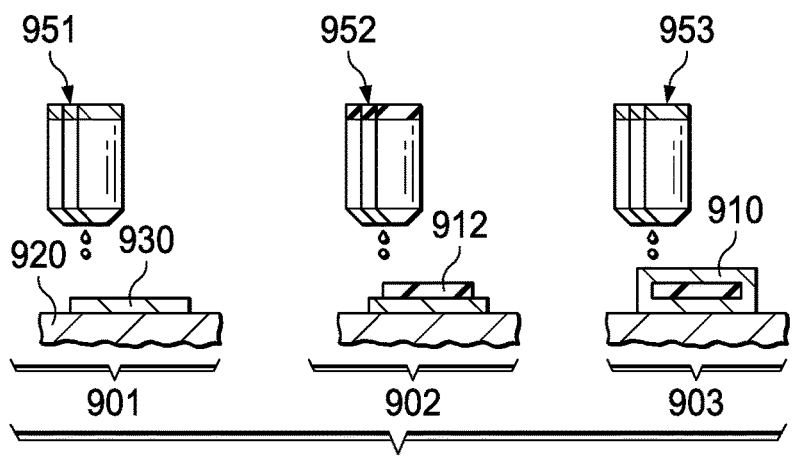
FIGS. 9-10 are process flow diagrams illustrating fabrication of various configurations of waveguides using a three dimensional printing process.

FIG. 9 is a process flow diagram illustrating fabrication of a waveguide with a dielectric core similar to FIG. 5 and FIG. 6 using an ink jet printing process. In process step 901, an inkjet printing mechanism illustrated at 951 deposits a bottom layer 930 on a top surface of a substrate 920 using a known printing process. This bottom layer will form a bottom surface of the waveguide. Bottom layer 930 may be a dielectric layer for forming a dielectric waveguide similar to DWG 500. Similarly, bottom layer 930 may be a conductive layer for forming a conductive waveguide similar to DWG 600. Bottom layer 930 may be configured so that it only extends across the bottom region of the wave guide, as illustrated in FIGS. 5-6, or it may be configured to extend beyond the walls of the waveguide, as illustrated in FIG. 8. Bottom layer 930 extends the length of the waveguide and conforms to the top surface of substrate 920.

In another embodiment, bottom layer 930 may be prefabricated on the substrate; for example, it may be a conductive layer that is laminated on the surface of substrate 920. In this example, unneeded portions of the conductive layer may be removed by etching, for example, or by other known fabrication techniques for creating patterned features on a substrate. In another embodiment, bottom layer 930 may be formed by diffusion of a layer onto substrate 920, or by sputtering a layer onto substrate 920, or by flooding the surface of substrate 920 with a liquid or paste, etc., for example. In another embodiment, a stamped metal or dielectric shape may be laminated or otherwise affixed to substrate 920 to form bottom layer 930

In process step 902, a core member 912 is formed by printing a dielectric material to form the core of the waveguide. Multiple passes of print-head 952 may be required to obtain a desired thickness for core 912. The printed dielectric may be composed of any dielectric material which can be deposited in thick layers, such as polymers, oxides, etc., for example. The dielectric material for the main portion of core 912 may be deposited as a single bulk material with relative permittivity $\varepsilon r4$, for example, referring back to core portion 204 in FIG. 2. Additional passes of print-head 952 may be performed using materials having different dielectric constant values to form the multiple sectors of transition region 205, referring back to FIG. 2.

During process step 903, a conformal cladding coating is applied by print-head 953 to cover the top and sides of the waveguide. In this manner, core 912 is enclosed with a conductive cladding 910 or a dielectric cladding to form a waveguide. Various conductive materials that can be printed in this manner may be used to form coating 910, such as: a conductive ink with metallic filler, a conductive polymer formed by ionic doping, carbon and graphite based compounds, conductive oxides, etc., for example. Similarly, a dielectric material similar to base layer 930 may be used to form the cladding for a non-conductive DWG, for example.

Figure 10:
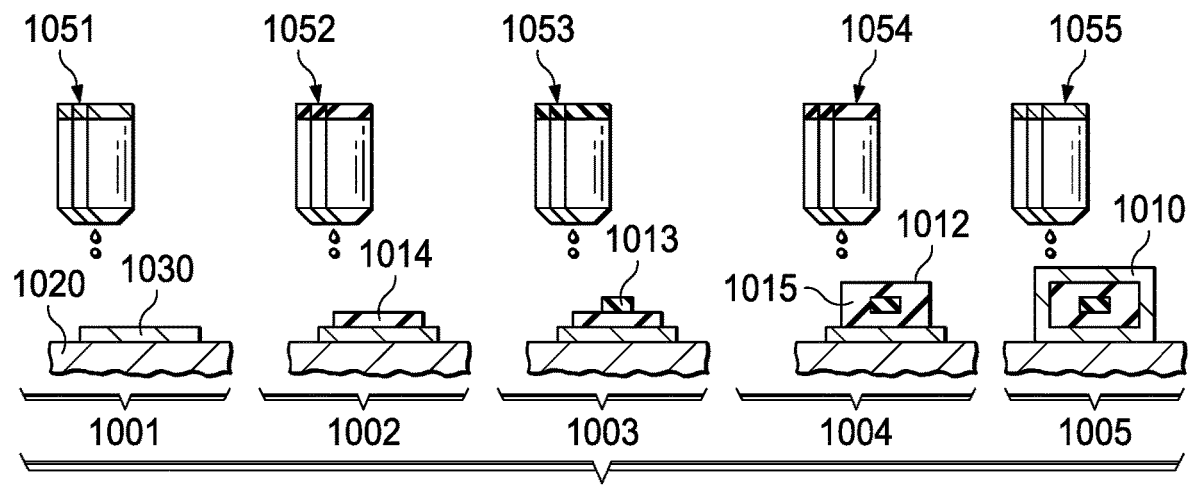

FIG. 10 is a process flow diagram illustrating fabrication of a metallic waveguide with a dielectric core similar to FIG. 7 using an ink jet printing process. In this example, a bottom layer 1030 is formed on a top surface of substrate 1020 by a print-head 1051 during process step 1001, in a similar manner as described above with regard to FIG. 9. A first core layer 1014 is formed by print-head 1052 during process step 1002 in a similar manner as described above.

During process step 1003, a region 1013 of the core is formed by print-head 1053 using a dielectric material that has a different dielectric constant than the material used for layer 1014. Then, in step 1004 another layer 1015 of dielectric material is applied by print-head 1054 to complete the core member of the waveguide. In this example, three layers 1014, 1013, and 1015 are used to form core member 1012. In this example, layer 1013 has a relative dielectric constant value $\varepsilon r1$ that is greater than the relative dielectric constant value $\varepsilon r2$ of layers 1014, 1015. As discussed above, in this manner is graded core may be formed that allows the sub-THz signal to be more confined within the region of the dielectric core.

Multiple passes of print-head 1053 may be required to obtain a desired thickness for core 1013. The printed dielectric may be composed of any dielectric material which can be deposited in thick layers, such as polymers, oxides, etc., for example. The dielectric material for the main portion of core 1013 may be deposited as a single bulk material with relative permittivity $\varepsilon r4$, for example, referring back to core portion 204 in FIG. 2. Additional passes of print-head 1053 may be performed using materials having different dielectric constant values to form the multiple sectors of transition region 205, referring back to FIG. 2.

In some embodiments, additional passes of print-head 1054 may be performed using materials having different dielectric constant values while forming core portion 1015 to form the multiple sectors of transition region 205, for example, referring back to FIG. 2.

In another embodiment, additional layers may be used to form core member 1012 using a range of relative permittivity of $\varepsilon r1$-$\varepsilon rn$, for example.

During process step 1005, a printed conductive coating is applied by print-head 1055 to cover the top and sides of the waveguide. In this manner, core 1012 is enclosed with a conductive cladding 1010 to form a waveguide, as discussed in more detail above.

For all of the waveguide embodiments described above, the waveguides may be printed arbitrarily long in a desired pattern in the plane of the substrate. Printed waveguides may conform to the surface topology of the substrate. If the substrate is flexible, the waveguide may also be flexible as long as the materials used to print the waveguide are also flexible.

In another embodiment, the dielectric core may be formed in a such a manner that the dielectric core has a dielectric constant value that varies over at least two values along the longitudinal extent of the dielectric core. This may be done by printing different materials along the extent of the dielectric core, for example. This may be useful for matching impedance of the waveguide to another waveguide, for example.

Typically, using a lithographic process to form the dielectric core would produce essentially vertical sidewalls on the dielectric core. Deposition of a metallic material to cover the dielectric core may be difficult when the sides of the dielectric core are vertical. However, using an inkjet process to form the dielectric core and controlling the surface tension of the ink allows the slope, or angle, of the sidewalls of the printed waveguide to be controlled. Thus, the sidewalls of the dielectric core may be formed with a slight inward slope, or may be formed perfectly vertical, depending on the needs of the next processing step. In this manner, deposition of the metallic sidewalls may be improved. This may not be an issue in other 3D printing processes, however.

Figure 11:
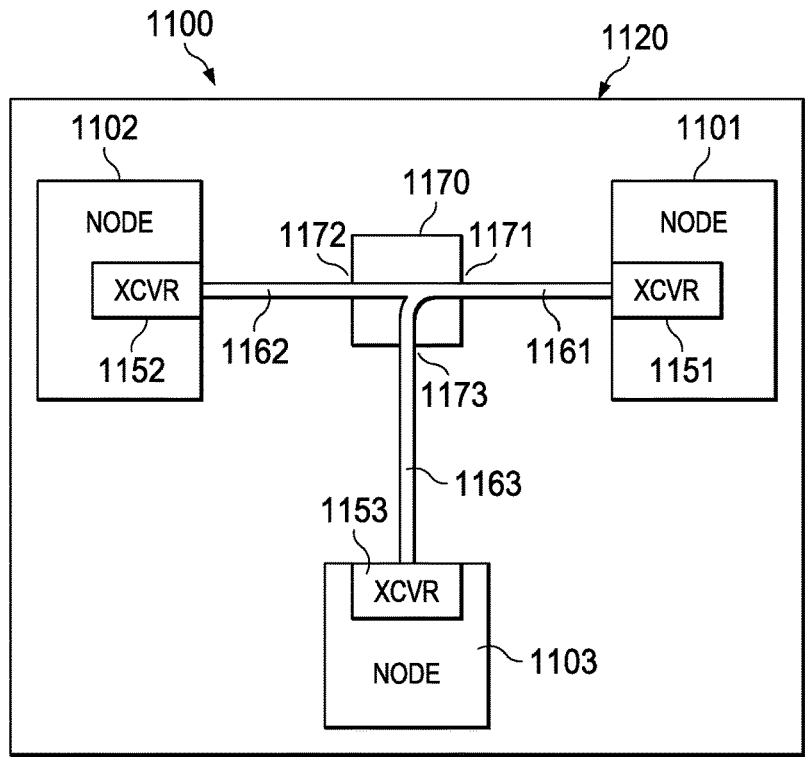
FIG. 11 is an illustration of three system nodes being interconnected with a dielectric core waveguide formed on a substrate.

FIG. 11 is an illustration of a system 1100 that has at three nodes 1101, 1102, and 1103 that are interconnected with metallic DWGs 1161, 1162, 1163 using a signal divider 1170 that are all formed on a substrate 1120. An example signal divider is described in more detail in U.S. patent application Ser. No. 14/498,512, filed Sep. 26, 2014, entitled "Dielectric Waveguide Signal Divider", which is incorporated by reference herein. The three nodes may be a computing device and two peripheral devices or three computing devices, for example. The nodes may be any form of computing device, such as, but not limited to: a system on a chip (SOC), a rack mount, desk mount, or portable computer, a mobile user device such a notebook computer, a tablet computer, a smart phone, etc., for example. The nodes may be any type of peripheral device such as: a media storage device such as rotating or solid state disk drive, a modem or other interface to a high speed network, etc., for example. Each node may be an integrated circuit. All of the nodes may be mounted on a common circuit board substrate 1120, for example.

Each node 1101, 1102, 1103 may be an SOC or may contain a PWB (printed wiring board) or other type substrate on which are mounted one or more integrated circuits that produce or receive a sub-terahertz signal that is coupled to a DWG using transceivers 1151, 1152, 1153, for example. The manner of coupling between the IC and the DWG may be implemented using any of the techniques described in more detail in U.S. patent application Ser. No. 13/854,935, or later developed, for example.

Waveguides 1161, 1162, and 1163 may be any form of flexible or rigid DWG as described in more detail above, for example. Various system embodiments may have more or fewer nodes interconnected with waveguides that are formed on a substrate, for example. One or more of waveguides 1161, 1162, and 1163 may include a transition region as described above in more detail to improve signal coupling to the associated signal launching mechanism.

In some embodiments, one or more of segments 1161-1163 may have a metallic or otherwise conductive sidewalls, while one or more of segments 1161-1163 may be a dielectric waveguide in which the sidewall cladding is also a dielectric material having a lower dielectric constant value than the core region.

DWGs 1161, 1162, 1163 and signal divider 1170 may all be formed on a single substrate 1120 using an ink jet or another three dimensional printing process, for example. In another embodiment DWGs 1161, 1162, 1163, and signal divider 1170 may all be formed on a single substrate using PWB fabrication techniques with plating and etching, for example. In another embodiment, DWGs 1161, 1162, 1163 and signal divider 1170 may be formed using diffusion techniques to produce different dielectric constant values in a polymer material, for example.

In some embodiments, substrate 1120 may be silicon, or other semiconductor or insulator material, or a single integrated circuit that includes multiple functional nodes, often referred to as a system on a chip (SoC). In that case, the SoC may include an antenna or other coupling structure in a node such as node 1101, an antenna or other coupling structure in a second node such as node 1102, with a DWG coupled between the two nodes formed directly on the SoC substrate.

Figure 12:
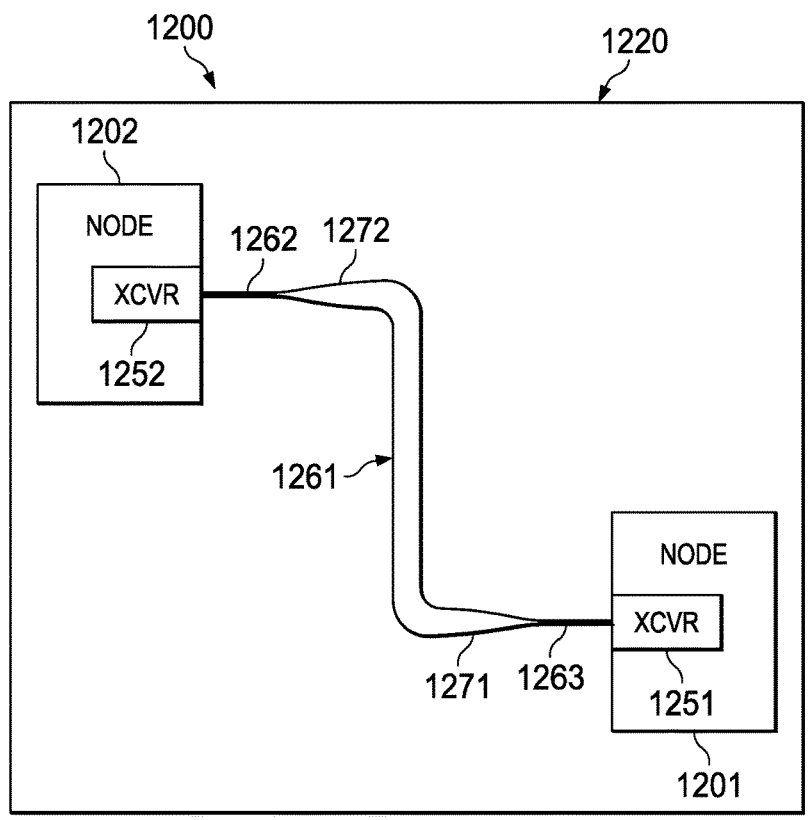
FIG. 12 is an illustration of a system in which the cross-section of a waveguide changes along its length.

FIG. 12 is an illustration of a system 1200 in which the cross-section of a waveguide changes along its length. In this example, two nodes 1201, 1202 with transceivers 1251, 1252 are mounted or otherwise formed on a surface of substrate 1220, as described in more detail above. Transceiver 1251 is coupled to transceiver 1252 by a waveguide that is also formed on the surface of substrate 1220 as described in more detail above.

In this example, the waveguide includes three segments 1261, 1262, 1263 that conform to the surface of substrate 1220. Since the waveguide segments may be fabricated using an inkjet process or other 3D printing process, the cross section of the segments may be easily varied to optimize transmission properties, for example. Typically, between each segment a transition zone 1271, 1272 may be provided to gradually transition from one waveguide configuration to the next. The transition zone may have a length that is greater than several wavelengths of a target signal, for example. Each segment 1261-1263 may have different properties, such as cross section size, (width×height), cross section aspect ratio (width vs. height), dielectric constant, etc., for example. One or more of waveguides 1262, 1263 may include a transition region as described above in more detail to improve signal coupling to the associated signal launching mechanism.

In another embodiment, a DWG segment may be designed to have a different impedance than another DWG segment. For example, a higher permittivity/permeability section of DWG may be used to form a corner or bend in a DWG in order to reduce signal radiation at the corner/bend. In this case, transition regions may be implemented as described above in more detail to gradually transition between the different impedances of the coupled segments.

In another embodiment, a transition region as described above in more detail may be used to manage impedance change between a DWG coupled to a transmission line or microstrip, for example.

In some embodiments, one or more of segments 1261-1263 may have a metallic or otherwise conductive sidewalls, while one or more of segments 1261-1263 may be a dielectric waveguide in which the sidewall cladding is also a dielectric material having a lower dielectric constant value than the core region, for example.

Figure 13:
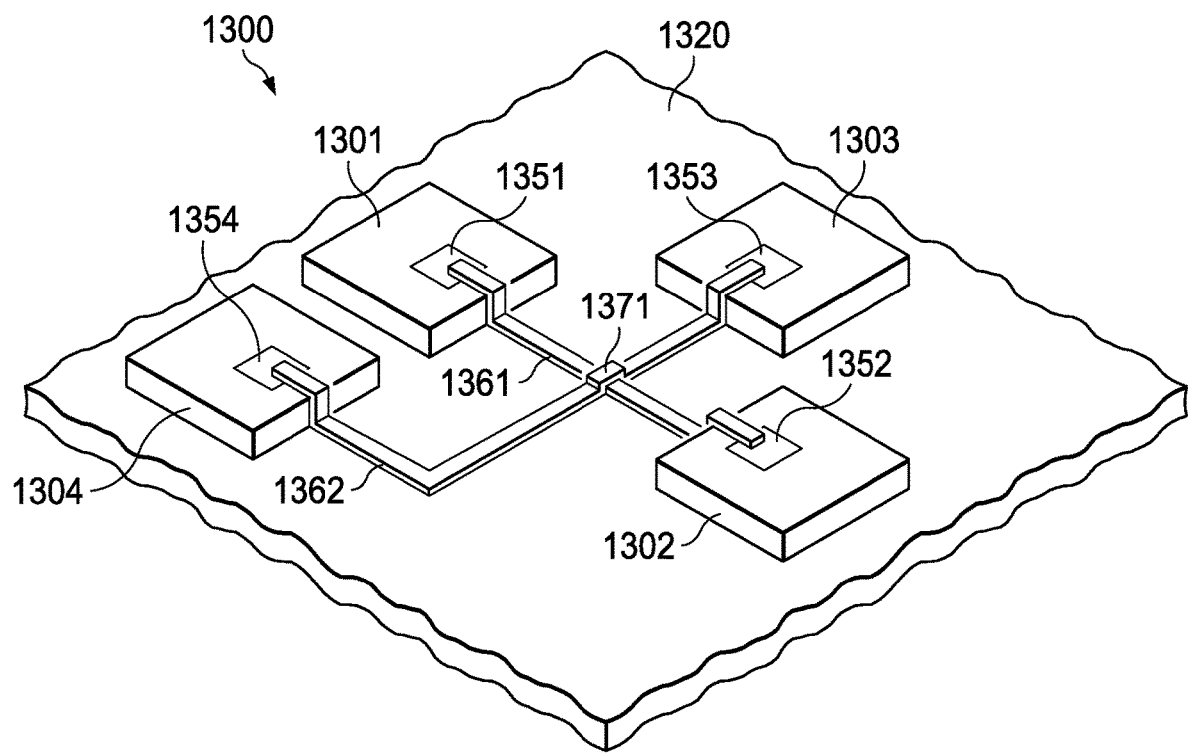
FIG. 13 is an illustration of a system illustrating various aspects of conformal waveguides.

FIG. 13 is an illustration of a system 1300 illustrating various aspects of conformal waveguides. In this example, four nodes 1301-1304 with transceivers 1351-1354 are mounted or otherwise formed on a surface of substrate 1320, as described in more detail above. Transceiver 1351 is coupled to transceiver 1352 by a waveguide 1361 that is also formed on the surface of substrate 1320 as described in more detail above. Likewise, transceiver 1353 is coupled to transceiver 1354 by a waveguide 1362 that is also formed on the surface of substrate 1320 as described in more detail above.

As described in more detail above, waveguides 1361, 1362 may be formed directly on the surface of substrate 1320 using an inkjet process or other form of 3D printing. This process allows the wave guides to be formed on a chip die of each node and to then follow over the edge of each die an onto the surface of substrate 1320. In a similar manner, one waveguide, such as 1362, may be routed over the top of another waveguide, such as 1361, as indicated at 1371, for example.

In some embodiments, substrate 1320 may be a single integrated circuit that includes multiple functional nodes in a single SoC. In that case, the SoC may include an antenna or other coupling structure in each node such as node 1301-1304, with one or more DWGs coupled between the two nodes formed directly on the SoC substrate. In this manner, a wide degree a freedom is available to route multiple waveguides on a surface of the substrate, and to cross over other waveguides or other physical features that are present on the surface of the substrate.

Figure 14:
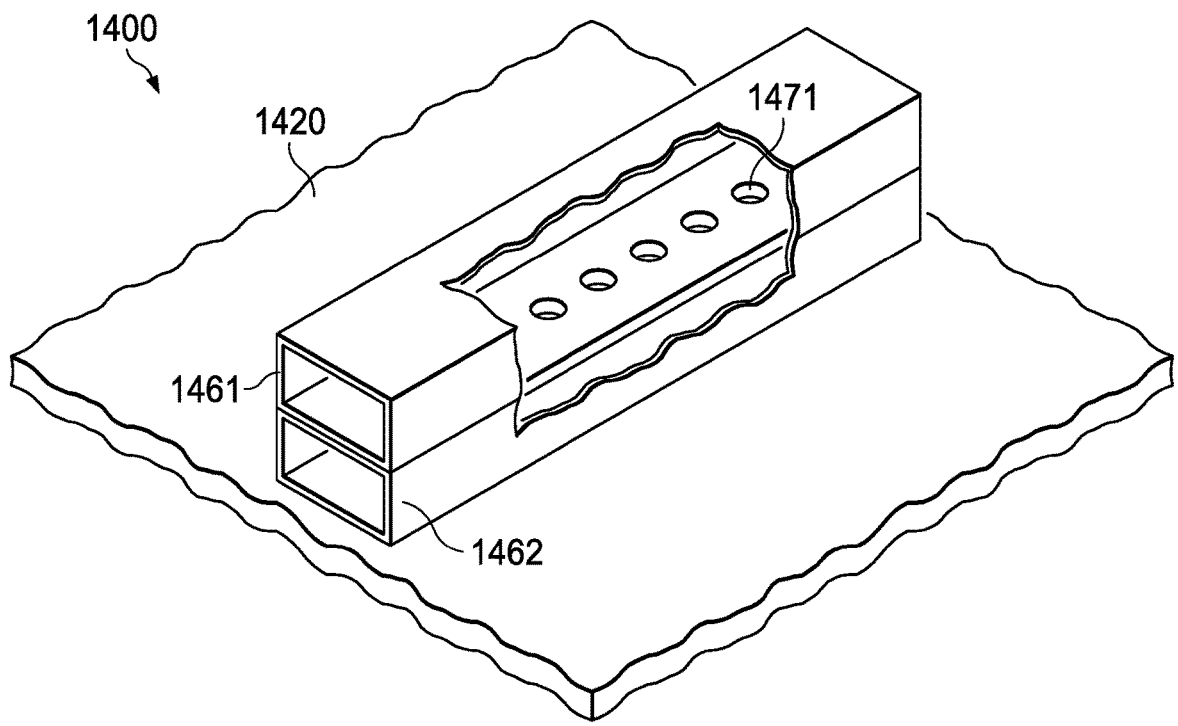
FIG. 14 is an illustration of two waveguides that are stacked.

FIG. 14 is an illustration of two waveguides 1461, 1462 that are stacked. Due to the digital nature of printing waveguides, multiple waveguides may be printed on top of each other, next to each other, overlapping, etc. This allows flexibility to not only create 3D signal routing schemes, but also create couplers, filters, etc. This may be done by repeating the steps illustrated in FIGS. 6-8 for each additional layer of waveguide, for example.

In this example, a set of holes 1471 may be formed between waveguide 1461 and 1462 during the printing process by simply omitting material to form each hole. In this manner, a signal propagating along waveguide 1461 may be coupled into waveguide 1462, or vice versa, for example.

As shown by the above descriptions and examples, multiple electronic devices may be easily interconnected to provide sub-terahertz communication paths between the electronic devices by using the techniques described herein.

Printable metallic waveguides on top of a chip, package, or board may be processed onto nearly any substrate (silicon, Plexiglas, plastic, paper, etc. . . . ). Printed dielectric layers on the order of 100 nm-1 mm which are made possible by inkjet printing enable waveguide operation at Sub-THz frequencies; previously only optical frequencies could be reached using standard fabrication methods. A metallic or otherwise conductive shell provides isolation over standard dielectric waveguides.

Thus, extremely low-cost and low-loss sub-THz signal routing waveguides may be printed onto nearly any substrate. Printing the waveguides directly onto the chip/package/board mitigates alignment errors of standard waveguide assemblies and simplifies the packaging process.

OTHER EMBODIMENTS

While the invention has been described with reference to illustrative embodiments, this description is not intended to be construed in a limiting sense. Various other embodiments of the invention will be apparent to persons skilled in the art upon reference to this description. For example, while a dielectric waveguide has been described herein, another embodiment may use a metallic or non-metallic conductive material to form the top, bottom, and sidewalls of the wave guide, such as: a conductive polymer formed by ionic doping, carbon and graphite based compounds, conductive oxides, etc., for example. As used herein, the term "conductive waveguide" refers to a waveguide having either metallic or non-metallic conductive sidewalls.

While DWGs and metallic or otherwise conductive waveguides are described herein, the inkjet and 3D printing techniques described herein may also be used to form other forms of waveguides, micro-coax, etc., for example that conform to a surface of a substrate.

While waveguides with polymer dielectric cores have been described herein, other embodiments may use other materials for the dielectric core, such as ceramics, glass, etc., for example. A transition region in a ceramic core waveguide may be formed by using ceramics with different permittivities, for example.

The substrate on which a dielectric core waveguide is formed may be rigid or flexible, planar or non-planar, smooth or irregular, etc., for example. Regardless of the topology of the substrate, the dielectric core waveguide may be formed on the surface of the substrate and conform to the topology of the surface by using the additive processes described herein.

While dielectric cores with a rectangular cross section are described herein, other embodiments may be easily implemented using the printing processes described herein. For example, the dielectric core may have a cross section that is rectangular, square, trapezoidal, cylindrical, oval, or many other selected geometries. Furthermore, the processes described herein allow the cross section of a dielectric core to change along the length of a waveguide in order to adjust impedance, produce transmission mode reshaping, etc., for example.

In some embodiments, the substrate may be removed after forming a waveguide using the inkjet printing or other 3d printing process by dissolving the substrate with an appropriate solvent or melting a heat sensitive substrate, for example. In this manner, a free standing waveguide that may have a complicated shape may be formed using the ease of fabrication and optional material variations available as described herein.

The dielectric core of the conductive waveguide may be selected from a range of approximately 2.4-12, for example. These values are for commonly available dielectric materials. Dielectric materials having higher or lower values may be used when they become available.

While formation of a conductive waveguide by directly printing the waveguide onto the substrate using a layer-by-layer additive fabrication technique such as inkjet-printing is described herein, other additive techniques such as screen-printing, flexographic printing, or 3D printing may also be used.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope and spirit of the invention.

What is claimed is:

1. A waveguide, comprising:
 a dielectric core comprising a first portion and a transition region;
 the first portion of the dielectric core having a first impedance; and
 the transition region of the dielectric core having a graduated impedance that changes from the first impedance adjacent the first portion to a second impedance by at least one of a permittivity or a permeability of the transition region varying along a length of the transition region.

2. The waveguide of claim 1, further comprising a metallic cladding surrounding the dielectric core.

3. The waveguide of claim 2, further comprising a substrate disposed below a side of the metallic cladding, wherein a surface of the substrate is irregular.

4. The waveguide of claim 1, wherein the graduated impedance of the transition region of the dielectric core gradually changes in two or more discrete sectors, wherein each of the two or more discrete sectors each have different impedances.

5. The waveguide of claim 1, wherein the graduated impedance of the transition region of the dielectric core gradually changes in a continuous manner.

6. The waveguide of claim 1, wherein the transition region is located at an end of the waveguide.

7. The waveguide of claim 1, wherein the transition region has a graduated dielectric constant value that gradually changes from a first dielectric constant value adjacent the first portion to a second dielectric constant value.

8. The waveguide of claim 1, wherein the dielectric core is a graded dielectric core comprising two or more longitudinal regions each having a different dielectric constant value.

9. The waveguide of claim 1, wherein the dielectric core has a dielectric constant value in a range of approximately 2.4-12.

10. The waveguide of claim 1, wherein the permittivity of the transition region varies.

11. The waveguide of claim 1, wherein the permeability of the transition region varies.

12. A method of forming a waveguide, the method comprising:
    forming a conformal base layer for the waveguide on a surface of a substrate;
    forming a first portion having a first dielectric of a dielectric core for the waveguide, on the conformal base layer;
    forming a transition region of the dielectric core adjacent the first portion having a graduated impedance that changes from a first impedance adjacent the first portion to a second impedance by at least one of a permittivity or a permeability of the transition region varying along a length of the transition region; and
    forming sidewalls and a conformal top layer surrounding the dielectric core and in contact with the conformal base layer.

13. The method of claim 12, wherein at least one of the conformal base layer, sidewalls and conformal top layer is metallic.

14. The method of claim 12, further comprising removing the substrate after forming the waveguide.

15. The method of claim 12, wherein the conformal base layer matches a footprint of the waveguide.

16. The method of claim 12, wherein the conformal base layer extends beyond a footprint of the waveguide.

17. The method of claim 12, wherein the surface of the substrate is irregular, and wherein the conformal base layer is formed to conform to the irregular surface of the substrate.

18. The method of claim 12, wherein the permittivity of the transition region varies.

19. The method of claim 12, wherein the permeability of the transition region varies.

20. The method of claim 12, wherein forming the transition region of the dielectric core is performed using an ink jet printing process.

* * * * *